United States Patent
Muenzel et al.

(10) Patent No.: US 10,573,935 B2
(45) Date of Patent: Feb. 25, 2020

(54) BATTERY SYSTEM INCLUDING CIRCUIT MODULE FOR SELECTIVELY CONNECTING A PLURALITY OF BATTERY CELL UNITS

(71) Applicant: RELECTRIFY HOLDINGS PTY LTD, Cremorne VIC (AU)

(72) Inventors: Jan Valentin Muenzel, Cremorne (AU); Daniel Crowley, Cremorne (AU)

(73) Assignee: RELECTRIFY HOLDINGS PTY LTD (AU)

( * ) Notice: Subject to any disclaimer, the term of this patent is extended or adjusted under 35 U.S.C. 154(b) by 0 days.

(21) Appl. No.: 15/760,173

(22) PCT Filed: Sep. 29, 2016

(86) PCT No.: PCT/AU2016/050917
§ 371 (c)(1),
(2) Date: Mar. 14, 2018

(87) PCT Pub. No.: WO2017/054049
PCT Pub. Date: Apr. 6, 2017

(65) Prior Publication Data
US 2018/0269542 A1 Sep. 20, 2018

(30) Foreign Application Priority Data
Sep. 30, 2015 (AU) .............................. 2015903990

(51) Int. Cl.
*H01M 10/44* (2006.01)
*H01M 10/42* (2006.01)
(Continued)

(52) U.S. Cl.
CPC ....... *H01M 10/441* (2013.01); *H01M 2/1077* (2013.01); *H01M 2/305* (2013.01);
(Continued)

(58) Field of Classification Search
CPC .. H01M 10/441; H01M 2/1077; H01M 2/305; H01M 2/34; H01M 10/443;
(Continued)

(56) References Cited

U.S. PATENT DOCUMENTS 3,923,116 A 12/1975 Thompson et al.
6,043,628 A 3/2000 Perelle et al.
(Continued)

FOREIGN PATENT DOCUMENTS

EP 1273372 B1 2/2009
WO WO 2014/012794 1/2014

OTHER PUBLICATIONS

International Search Report dated Nov. 7, 2016 in International Application No. PCT/AU2016/050917, filed Sep. 29, 2016, in 4 pages.

(Continued)

*Primary Examiner* — Gary D Harris
(74) *Attorney, Agent, or Firm* — The Belles Group, P.C.

(57) ABSTRACT

The present invention is directed to a circuit module for coupling a plurality of battery cell units. The circuit module includes a first set of terminals having a positive terminal and a negative terminal for coupling to a first battery cell unit, and a second set of terminals having a positive terminal and a negative terminal for coupling to a second battery cell unit. The positive terminal of the first set of terminals is coupled to the negative terminal of the second set of terminals either directly or via one or more passive components, and the negative terminal of the first set of terminals and the positive terminal of the second set of terminals each is coupled to a switching assembly. The switching assembly is operatively configured to selectively connect or bypass each one of the battery cell units. The invention is also
(Continued)

directed to a battery system including the circuit module and a plurality of battery cell units.

18 Claims, 6 Drawing Sheets

(51) Int. Cl.
*H01M 2/10* (2006.01)
*H01M 2/30* (2006.01)
*H01M 2/34* (2006.01)

(52) U.S. Cl.
CPC ........... *H01M 2/34* (2013.01); *H01M 10/425* (2013.01); *H01M 10/443* (2013.01); *B60L 2240/545* (2013.01); *B60L 2240/547* (2013.01); *B60L 2240/549* (2013.01); *H01M 2010/4271* (2013.01); *H01M 2220/20* (2013.01)

(58) Field of Classification Search
CPC .. H01M 10/425; H01M 6/00; H01M 2220/20; H01M 2010/4271; B60L 50/64; B60L 58/22; B60L 3/0046; B60L 50/66; B60L 2240/549; B60L 2240/547; B60L 2240/545; B60K 6/00; Y02T 10/7061; Y02T 10/7005
USPC .......................................................... 429/62
See application file for complete search history.

(56) References Cited

U.S. PATENT DOCUMENTS

| | | |
|---|---|---|
| 6,140,799 A | 10/2000 | Thomasson |
| 6,430,692 B1 | 8/2002 | Kimble et al. |
| 8,816,613 B2 | 8/2014 | Lee |
| 2004/0164706 A1 | 8/2004 | Osborne |
| 2007/0062744 A1 | 3/2007 | Weidenheimer et al. |
| 2007/0275593 A1 | 11/2007 | Barwick |
| 2009/0128158 A1 | 5/2009 | Kawai |
| 2010/0261047 A1 | 10/2010 | Kim et al. |
| 2012/0091802 A1 | 4/2012 | Adelson et al. |
| 2012/0091964 A1 | 4/2012 | Vance et al. |
| 2014/0015488 A1* | 1/2014 | Despesse ............ H01M 10/425 320/122 |
| 2016/0336623 A1 | 11/2016 | Nayar et al. |

OTHER PUBLICATIONS

International Preliminary Report on Patentability dated Dec. 20, 2017 in International Application No. PCT/AU2016/050917, filed Sep. 29, 2016, in 50 pages.

International-Type Search Report dated Nov. 24, 2017 for related Australian Application No. 2017900386, filed Feb. 8, 2017, in 9 pages.

Supplementary European Search Report from corresponding EP Application No. EP16849956 dated May 8, 2019, pp. 1-8.

* cited by examiner

BATTERY SYSTEM INCLUDING CIRCUIT MODULE FOR SELECTIVELY CONNECTING A PLURALITY OF BATTERY CELL UNITS

CROSS-REFERENCE TO RELATED PATENT APPLICATIONS

The present application is a U.S. national stage application under 35 U.S.C. § 371 of PCT Application No. PCT/AU2016/050917, filed Sep. 29, 2016, which claims priority to Australian Patent Application No. 2015903990, filed Sep. 30, 2015. The disclosures of the aforementioned priority applications are incorporated herein by reference in their entireties.

TECHNICAL FIELD

The invention described herein generally relates to energy storage systems such as battery systems.

BACKGROUND ART

Energy storage systems for applications such as full electric vehicles, hybrid electric vehicles, and stationary energy storage in grid connected or off grid applications, frequently include an arrangement of multiple energy storage cell units. Each cell unit is limited by its functional mechanism and design to provide an output voltage within a certain range depending on its state of charge and operating conditions. Each cell unit is also limited by its functional mechanism and design to provide a certain maximum charge storage capability, depending on the operating conditions. Electrically connecting cell units in series increases the maximum achievable output voltage, therefore decreasing the magnitude of current required to supply a given power output. This increases the system efficiency as ohmic losses increase with current magnitude. Electrically connecting cell units in parallel increases the maximum achievable storage capacity for a given cell unit capacity and storage system output voltage level.

The individual cell units inevitably display some differences in terms of charge storage capacity, internal resistance, and other performance related factors. Even before entering their operating life, cell units inevitably have differences caused by manufacturing tolerances that allow for certain variations in cell units during manufacturing with even the most advanced state of the art manufacturing processes. Throughout the operating life, variations in cell unit performance degradation conditions or profiles further contribute to these differences. In applications in which used cell units are recycled for re-use, the cell units can be associated with notable performance differences, particularly if the cell units have been exposed to different usage profiles. Utilising cell units with different specifications can also contribute to cell unit differences.

In energy storage systems that include multiple energy storage units, such differences between cell units can impact how the overall energy storage system is managed and performs. In cell units that are electrically connected in parallel, lower performing cell units contribute or accept a lower current during a discharge or charge process, respectively. This leads to higher performing cell units contributing to or accept a higher current during a discharge or charge process, respectively. Such rate increases can decrease the system efficiency, increase cell unit degradation, and potentially present safety risks. It is therefore often necessary to constrain the entire system to a lower power input or output level. In cell units that are electrically connected in series, lower charge capacity cell units can contribute or accept less electric charge during a discharge or charge process, respectively. Due to the series arrangement, higher charge capacity cell units are limited to contribute only an equal amount of charge as the lowest charge capacity cell unit. This means that the cell unit with the lowest charge capacity limits the charge storage capacity of the full energy storage system.

Conventional battery management systems typically use switched resistors to dissipate surplus energy from higher charged cell units, or switched capacitors or switched inductors to transfer energy from higher charged cell units to lower charged cell units. The primary role of these systems is to equalise the state of charge differences of cell units connected in series at a particular point in the charge discharge cycles, for example at the end of charging. Equalising the state of charge at one specific point in the cycle ensures that the lowest capacity cell unit in a series arrangement is able to be fully used. It does not, however, allow higher capacity cell units to contribute more energy to the output.

For example, assume two fully charged battery cell units connected in a series arrangement have capacities for 1 Ah and 10 Ah, respectively. If this system discharges at a rate of 1 A then, assuming no equalisation during the discharge, the entire system has a discharge time of one hour during which it will provide 2 Ah consisting of 1 Ah from the lower capacity cell unit and 1 Ah from the higher capacity cell unit.

In order to overcome the limitations posed by the lowest capacity cell unit in an energy storage system comprising multiple cell units connected in series, a more advanced approach is required. Switched capacitor or switched inductor balancing systems can be operated to transfer energy on a continuous basis, for example transferring energy from higher charge capacity cell units to lower charge capacity cell units throughout part or all of the discharge process. However, the electrical pathways and components used to equalise the cell units are typically rated to energy throughputs that are only a fraction of the rating of the full energy storage system. As such, the systems typically can only account for a fraction of the difference between the cell units.

For example, assume two fully charged battery cell units connected in a series arrangement have capacities for 1 Ah and 10 Ah, respectively. If this system discharges at a rate of 1 A and additionally transfer energy from the lower charged cell unit to the higher charged cell unit at a rate of 0.1 A, then after one hour, the system has provided a capacity of 2 Ah. At this point, due to the energy transfer, the lower charge capacity cell unit still holds 0.1 Ah and the higher charge capacity cell unit still holds 8.9 Ah, allowing discharging to be continued for approximately 0.1 hours longer and resulting in a full energy storage system capacity that is around 0.2 Ah larger than without any equalisation system. The additional discharge time and energy that can be maintained from higher charge capacity cell units increases with the energy rating of the equalisation system, which can increase the cost and space requirements among other factors. This leads such battery management approaches to predominantly be useful for energy storage systems with relatively small differences only, such as energy storage systems based on not previously used cell units with the same specifications. Furthermore, using switched capacitors or switched inductors requires energy to be transferred via intermediary storage devices such as capacitors or inductors, respectively, which can be associated with losses that negatively impact the full energy storage system efficiency.

A further method to address the limitations posed by differences between cell units that are connected in series is to use voltage converters. Typically, each cell unit is connected to one voltage converter, and the voltage converters are connected in parallel leading to a coupling on the direct current side. This can then be either directly or via a further voltage converter connected to an inverter. Another option is to connect each cell unit to one voltage converter, and connect each voltage converter to an inverter and connect the inverters in parallel so that the energy from the cell units is connected on the alternating current side. A further option is to use voltage converters with the output connected in series. Disadvantages of using voltage converters include the considerable component cost of converters, some prospective limitations in controllability of cell charging and discharging depending on controller type and layout, and the limited efficiency of voltage converters, partly due to energy losses in storage elements used for voltage conversion such as inductors and/or capacitors.

Switches can also be used to connect or bypass the cell units. By bypassing lower-performing cell units, additional charge and discharge capacity can be unlocked from the other cell units. Some disadvantages of current systems using this approach are that for each cell unit connected in series, an additional switch is placed in any given current path contributing an associated on resistance and energy loss.

It is an aim of the invention to provide a battery system which overcomes or ameliorates one or more of the disadvantages or problems described above, or which at least provides the consumer with a useful choice.

SUMMARY OF THE INVENTION

According to one aspect of the invention, there is provided a circuit module for coupling a plurality of battery cell units, the circuit module including a first set of terminals having a positive terminal and a negative terminal for coupling to a first battery cell unit, and a second set of terminals having a positive terminal and a negative terminal for coupling to a second battery cell unit, the positive terminal of the first set of terminals being coupled to the negative terminal of the second set of terminals either directly or via one or more passive components, and the negative terminal of the first set of terminals and the positive terminal of the second set of terminals each being coupled to a switching assembly, wherein the switching assembly is operatively configured to selectively connect or bypass one or more of the battery cell units.

Therefore, the positive terminal of the first set of terminals may be directly coupled to the negative terminal of the second set of terminals, or the positive terminal of the first set of terminals may be coupled to the negative terminal of the second set of terminals via one or more passive components such as conductors, fuses, resistors, inductors or any other like components. In the present specification, passive components refer to any circuitry component such as conductors, fuses, resistors, inductors or any other like that operates in a non-switching manner.

In practice, arranging the circuit in such a way that the positive terminal of the first set of terminals are directly coupled or coupled via passive component(s) to the negative terminal of the second set of terminals may advantageously allow all of the switching assemblies to be located on a single side of the circuit module, thereby greatly simplifying the configuration of the circuit module. In a battery system incorporating such a circuit module, this allows all circuitry components, (e.g. PCB circuit boards and the like carrying the switching assemblies) to be located on a single side of the terminal sets (e.g. a single side of the battery cell units once coupled to the circuit module). In this manner, the overall number of circuit components can be minimised and the arrangement or configuration of the circuit components can be simplified, thus reducing impedance and losses in the overall battery system, and also reducing manufacturing time and costs. Moreover, the overall weight and size of the battery system can be minimised. This can be advantageous particularly in applications where space and weight restrictions apply.

In one embodiment, in any switching state of the switching assemblies, at most one switch is closed in a current path between adjacent battery cell units during operation of the circuit module.

In one embodiment, when all of the battery cell units are connected to the circuit module, at most one switch is closed in a current path between adjacent battery cell units.

In one embodiment, in any switching state of the switching assemblies, the ratio of closed switches to battery cell units is less than one during operation of the circuit module.

In one embodiment, when all of the battery cell units are connected to the circuit module, the ratio of closed switches to battery cell units is less than one.

Reducing the number of closed switches in the current path between active battery cell units advantageously reduces losses due to switching resistance, thereby improving the overall performance of the battery system.

Each switching assembly may include a first switch for connecting an associated battery cell unit, and a second switch for bypassing the associated battery cell unit.

In a first embodiment, for the first set of terminals, the first switch of the associated switching assembly is coupled to the negative terminal of the first set of terminals on one side, and the second switch on a second side; and the second switch of the associated switching assembly is coupled to the first switch on one side, and the positive terminal of the first set of terminals on a second side. In this embodiment, for the second set of terminals, the first switch of the associated switching assembly is coupled to the positive terminal of the second set of terminals on one side, and the second switch on a second side; and the second switch of the associated switching assembly is coupled to the first switch on one side, and the negative terminal of the second set of terminals on a second side.

The first and second set of terminals along with their associated switching assemblies may form one unit of the circuit module. The circuit module may include a plurality of units coupled together.

Any suitable switching devices may be used. In some embodiments, the switching assemblies may include one or more electromechanical relays. The switching assemblies may include one or more transistors.

According to another aspect of the invention, there is provided a battery system including a circuit module as previously described, and a plurality of battery cell units coupled to the circuit module.

In one embodiment, the battery cell units are used battery cell units. In particular, the battery cell units may be used as batteries for hybrid-electric or pure electric vehicles.

In one application, the circuit module may be used for repurposing used vehicle batteries. In particular, used vehicle batteries may be coupled in series in the circuit module to provide a battery system for electrical energy storage. The battery system may provide electrical energy storage for residential or commercial use.

The battery system may further include a battery mount configured to allow one or more battery cell units to be mounted for coupling to the circuit module, wherein all switching assemblies of the circuit module are located to one side of the battery mount.

The battery mount may be configured to allow the one or more battery cell units to be retrofitted to the battery system at any time during its operating life. This advantageously allows the battery cell units to be conveniently added, removed and/or replaced.

The battery system may further include a controller for controlling the switching assemblies of the circuit module. The controller may control the switching assemblies based on the charge and discharge behaviour of the battery cell units. More specifically, the controller may determine the charge and discharge behaviour of each battery cell unit based on the voltage, current and/or temperature of the battery cell unit during charging and/or discharging.

In one embodiment, the controller may compare a measured voltage, current and/or temperature of a battery cell unit with predetermined voltage, current and/or temperature ranges and/or a measured voltage, current and/or temperature of a second battery cell unit, determine the battery cell units to connect and/or bypass, and control the switching assemblies to connect or bypass each battery cell unit.

Moreover, the controller may operate the switching assemblies at high frequency.

In some embodiments, the plurality of battery cell units can comprise a combination of individual battery cell units and blocks of parallel connected cells. In this specification, the terms "battery cell unit" or "cell unit" can refer to an individual battery cell or a block of cells connected in parallel, and similar reasoning applies to variations of those terms, such as plurals. It can also refer to a block of cells connected in parallel in which one or more circuit components such as fuses, resistors or inductors are connected in series and/or parallel with individual cells.

The battery cell units can be any suitable energy storage elements including for example, supercapacitors, and the like.

In this specification, the term "switch" refers to one or a plurality of circuit elements that can be controlled in a way that changes the path of current flow. In some embodiments, a switch comprises of one or a plurality of electromechanical relays. In some other embodiments, a switch comprises of one or a plurality of transistors.

In order that the invention may be more readily understood and put into practice, one or more preferred embodiments thereof will now be described, by way of example only, with reference to the accompanying drawings.

DETAILED DESCRIPTION OF PREFERRED EMBODIMENT(S)

Figure 1:
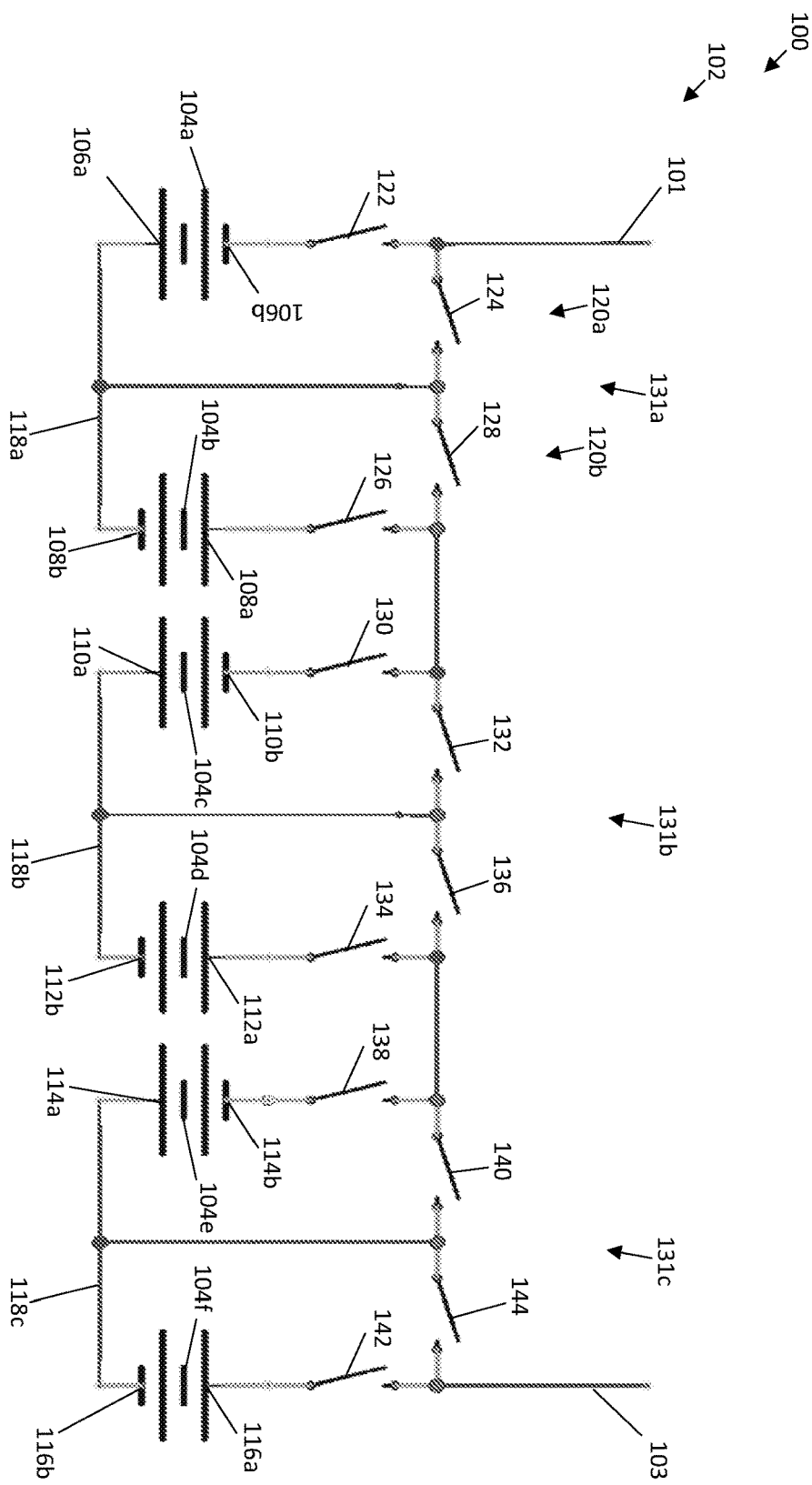
FIG. 1 is a circuit diagram of a battery system according to one embodiment of the invention.

A battery system 100 according to one embodiment of the invention is shown in FIG. 1. The battery system 100 includes a circuit module 102 for coupling to a plurality of battery cell units 104. For exemplary purpose, the battery system 100 includes six battery cell units 104*a*, 104*b*, 104*c*, 104*d*, 104*e*, 104*e*, 104*f*. However, any suitable number of battery cell units 104 may be used in the battery system 100. The battery system 100 includes battery pack terminals 101 and 103 for providing electrical energy to an external load or receiving electrical energy from an external supply (not shown).

The circuit module 102 includes six sets of terminals 106-116 for coupling with the battery cell units 104, each terminal set having a positive terminal 106*a*, 108*a*, 110*a*, 112*a*, 114*a*, 116*a*, and a corresponding negative terminal 106*b*, 108*b*, 110*b*, 112*b*, 114*b*, 116*b*. Each terminal set 106-116 is configured for coupling to a battery cell unit 104 (herein referred to as an associated battery cell unit 104). However, a person skilled in the art would understand that any number of terminals and battery cell units may be used in the battery system 100 or any of the battery systems described herein without departing from the scope of the invention.

In the battery system 100, the components of circuit module 102 are arranged in such a way that a positive terminal of one set of terminals 106*a*, 110*a*, 114*a* is directly coupled to the negative terminal of an adjacent set of terminals 108*b*, 118*b*, 116*b* by a conductor 118*a*-118*c*.

The negative terminal 106*b* of a first set of terminals 106 is coupled to a switching assembly 120*a*. Switching assembly 120*a* includes a first switch 122 for connecting battery cell unit 104*a* to the circuit module 102 when closed, and a second switch 124 for bypassing battery cell unit 104*a* when closed. More particularly, battery cell unit 104*a* is active or connected to the circuit module 102 when the first switch 122 is closed and the second switch 124 is open, and the battery cell unit 104*a* is inactive or bypassed from the circuit module 102 when the first switch 122 is open and the second switch 124 is closed.

Similarly, the positive terminal 108*a* of a second set of terminals 108 is coupled to a second switching assembly 120*b*. Switching assembly 120*b* includes a first switch 126 for connecting battery cell unit 104*b* to the circuit module 102 when closed, and a second switch 128 for bypassing battery cell unit 104*b* when closed. More particularly, battery cell unit 104*b* is connected to the circuit module 102 when the first switch 126 is closed and the second switch 128 is open, and the battery cell unit 104*b* is bypassed from the circuit module 102 when the first switch 126 is open and the second switch 128 is closed.

Accordingly, current flowing through battery cell unit 104*a* is controlled via the switches 122, 124. If switch 122 is closed and switch 124 is open, then any current flowing between pack terminals 101, 103 flows through switch 122 and battery cell unit 104*a*. If switch 122 is open and switch 124 is closed, then any current flowing between pack terminals 101, 103 passes through switch 124, but does not pass through battery cell unit 104a. Other battery cell units 104b-104f are controlled in a similar fashion via their associated switch assemblies.

The circuit layout including the two sets of terminals 106, 108, and the associated switching assemblies 120a, 120b respectively forms a single circuit unit block 131a of the battery system 100. The battery system 100 includes a further two circuit unit blocks 131b, 131c which are arranged in the same manner as unit block 131a. The three circuit units 131a, 131b, 131c are coupled together to form the overall system 100. However, it is understood that the system 100 may include any suitable number of unit block 131 to meet energy storage requirements of the specific application at hand.

As described, the positive terminal 106a for battery cell unit 104a is directly connected to the negative terminal 108b for battery cell unit 104b. Arranging the circuit in this way allows switches 122, 124, 126, 128 to be located in close physical vicinity on one side of the battery cell units 104a, 104b without the need to extend the length of the current path length between battery cell units 104 and the switches 122, 124, 126, 128. This advantageously results in reduced manufacturing costs, decreases space requirements, and avoids additional resistance, and thus energy losses caused by increased current path length.

However, in the battery system 100, to connect the positive terminal 106a for battery cell unit 104a to the negative terminal 112b of 104d through battery cell units 104b and 104c, the current passes through two switches 126, 130. In this embodiment, if all six battery cell units 104a-104f are to carry current, then the current also must pass through switches 122, 126, 130, 134, 138 and 142. This corresponds to current passing through one switch per cell unit, each of which has an on resistance and associated energy loss.

Figure 2:
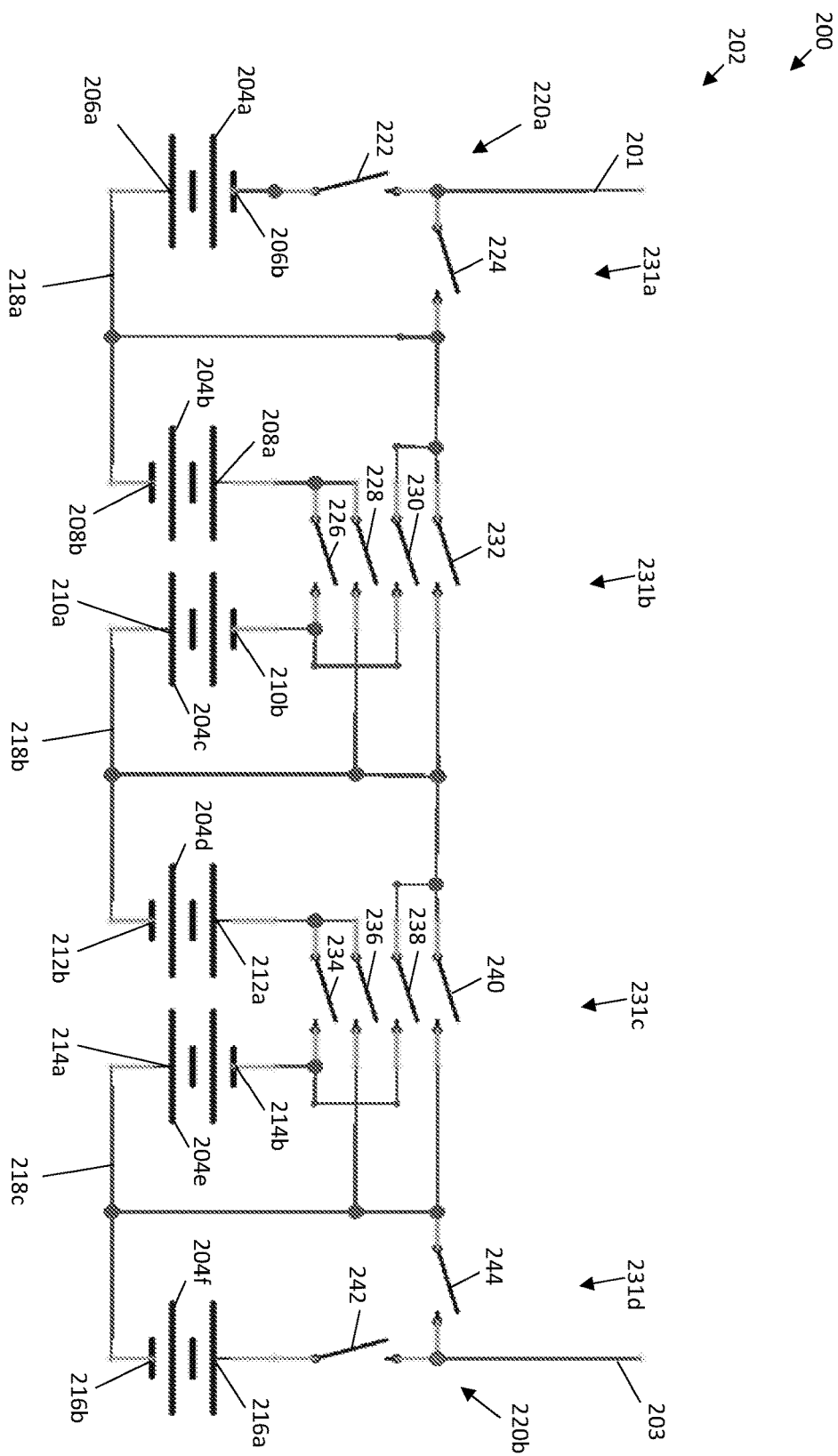
FIG. 2 is a circuit diagram of a battery system according to another embodiment of the invention.

The battery system 200 as shown in FIG. 2 further reduces the battery system on resistance and associated energy losses when all battery cell units 204 are connected to the circuit module 202 by reducing the total number of closed switches in the current path in this switching state as further explained below.

The battery system 200 includes circuit module 202 configured to receive six battery cell units 204a-204f coupled thereto. However, any suitable number of battery cell units 204 may be used in the battery system 200. The battery system 100 includes battery pack terminals 201 and 203 for providing electrical energy to an external load or receiving electrical energy from an external supply (not shown).

The circuit module 202 includes six sets of terminals 206-216 for coupling with the battery cell units 204, each terminal set having a positive terminal 206a, 208a, 210a, 212a, 214a, 216a, and a corresponding negative terminal 206b, 208b, 210b, 212b, 214b, 216b. Each terminal set 206-216 is configured for coupling to a battery cell unit 204.

In the battery system 200, the components of circuit module 202 are also arranged in such a way that a positive terminal of one set of terminals 206a, 210a, 214a is directly coupled to the negative terminal of an adjacent set of terminals 208b, 212b, 216b by a conductor 218a-218c.

The negative terminal 206b of a first set of terminals 206 is coupled to a switching assembly 220a. Switching assembly 220a includes a first switch 222 for connecting battery cell unit 204a to the circuit module 202 when closed, and a second switch 224 for bypassing battery cell unit 204a when closed. More particularly, battery cell unit 204a is connected to the circuit module 202 when the first switch 222 is closed and the second switch 224 is open, and the battery cell unit 204a is bypassed from the circuit module 202 when the first switch 222 is open and the second switch 224 is closed. The circuit layout including the set of terminals 206a, 206b and the switching assembly 220a forms a first end circuit unit block 231a.

Similarly, on an opposite end of the circuit module 202, the positive terminal 216a of terminal set 216 is coupled to switching assembly 220b. In a similar manner to switching assembly 220a, switching assembly 220b includes a first switch 242 for connecting battery cell unit 204f to the circuit module 202 when closed, and a second switch 244 for bypassing battery cell unit 204f when closed. The circuit layout including the set of terminals 216a, 216b and the switching assembly 220b forms a second end circuit unit block 231d.

Two further circuit unit blocks 231b, 231c are coupled between the end unit blocks 231a, 231d. For unit block 231b, the positive terminal 208a for battery cell unit 204b and the negative terminal 210b for battery cell unit 204c is coupled to a switching assembly comprising switches 226, 228, 230, 232. In particular, the positive terminal 208a for cell unit 204b is connected to one side of switches 226 and 228; the negative terminal 208b is connected to one side of switches 230 and 232; the negative terminal 210b for cell 204c is connected to the other side of switches 226 and 230; and the positive terminal 210a is connected to the other side of switches 228 and 232, Battery cell units 204b and 204c can be each connected and/or bypassed according to the switching states for switches 226-232 as shown in the table below.

| Cell unit 204b | Cell unit 204c | Switch 226 | Switch 228 | Switch 230 | Switch 232 |
|---|---|---|---|---|---|
| Connected/Active | Connected/Active | Closed | Open | Open | Open |
| Connected/Active | Bypassed/Inactive | Open | Closed | Open | Open |
| Bypassed/Inactive | Connected/Active | Open | Open | Closed | Open |
| Bypassed/Inactive | Bypassed/Inactive | Open | Open | Open | Closed |

Battery cell units 204b and 204c are both connected to the circuit module 202 when switch 226 is closed and switches 228, 230 and 232 are open; cell unit 204b is connected to and cell unit 204c is bypassed from the circuit module 202 when switch 228 is closed and switches 226, 230 and 232 are open; cell unit 204b is bypassed from and cell unit 204c is connected to the circuit module 202 when switch 230 is closed and switches 226, 228 and 232 are open; and cell units 204b and 204c are both bypassed from the circuit module 202 when switch 232 is closed and switches 226, 228 and 230 are open. Circuit unit block 231c operates in the same manner as circuit unit blocks 231b.

To reduce the total number of cell units 204 in battery system 200, one or more intermediate circuit unit blocks 231b, 231c can be removed or added to the circuit between end unit blocks 231a, 231b.

In battery system 200, the switches 222-244 are arranged in such a way that for at least one switching state, a battery cell unit 204 can be coupled to an adjacent battery cell unit 204 with at most one closed switch in the current path connecting the two adjacent battery cell units 204. In addition, the system 200 allows a battery cell unit to be coupled to an adjacent or non-adjacent cell unit 204 with at most one closed switch in the current path. For example, battery cell unit 204a can be coupled to adjacent battery cell unit 204b via conductor 218a and no switches; battery cell unit 204a can be coupled directly to non-adjacent battery cell unit 204c via conductors and a single closed switch 230; battery cell unit 204a can be coupled directly to non-adjacent battery cell unit 204d via conductors and a single closed switch 232. This configuration of circuit components advantageously reduces the total number of switches in the current path during operation to thereby reduce the ohmic energy losses due to on resistance of switches, and increasing the energy efficiency of the overall battery system 200.

Accordingly, to connect the positive terminal 206a for battery cell unit 204a to the negative terminal 212b of battery cell unit 204d, whilst connecting intermediate battery cell units 204b and 204c, the current only needs to pass through a single switch 226. In this battery system 200, when all six battery cell units 204a-204f are to carry current, only four switches 222, 226, 234 and 242 are closed and all other switches are open. In this switching state, as the current only flows through four switches 222, 226, 234 and 242, a switch to active battery cell unit ratio of less than one is achieved. Battery system 200 therefore decreases switch associated energy loss.

Similar to FIG. 1, the system 200 of FIG. 2 can also a plurality of switches to be located in close vicinity to one another and on a single side of the battery cell units 204, which in practice can decrease both manufacturing cost and space constraints.

Figure 3:
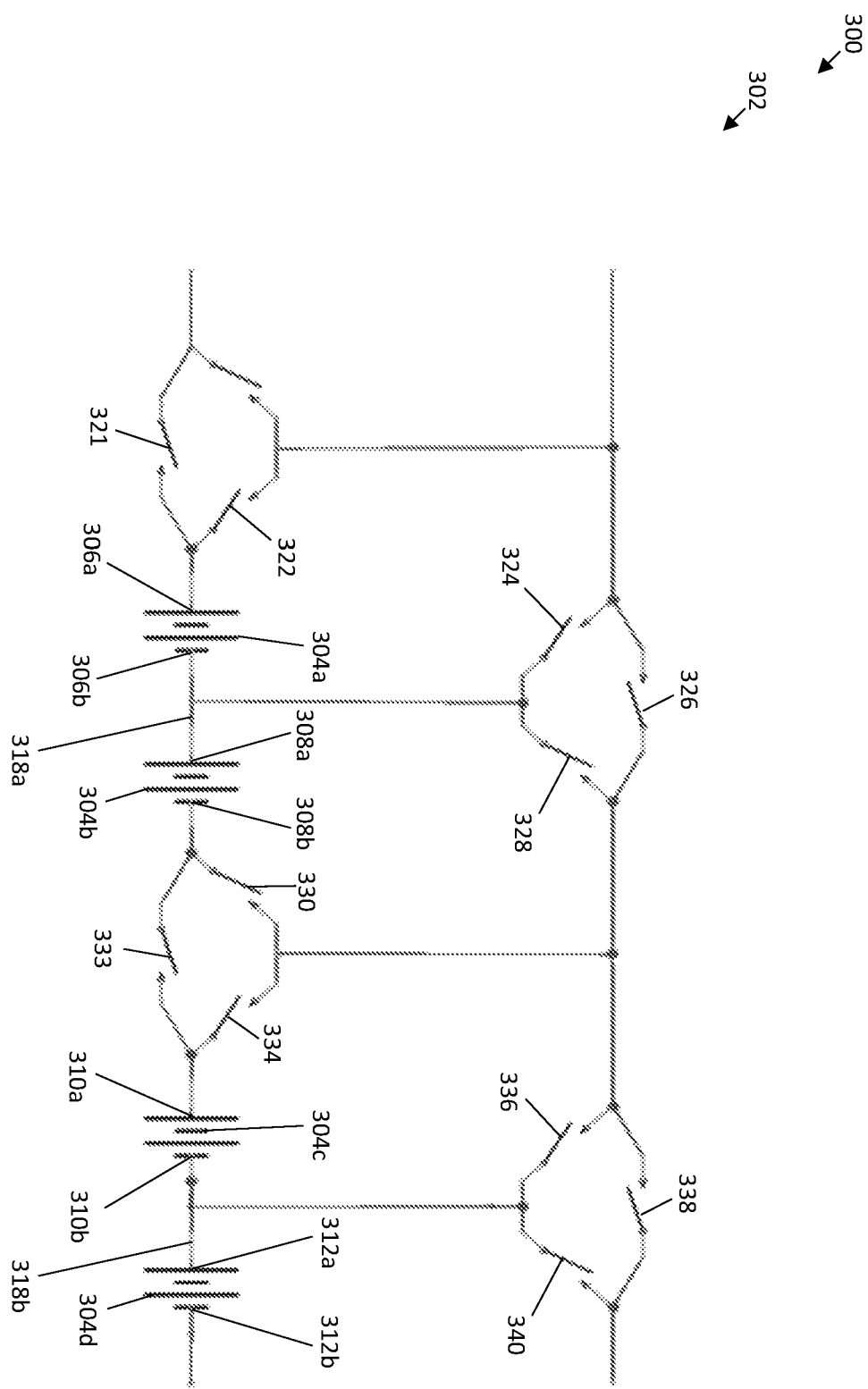
FIG. 3 is a circuit diagram of a battery system according to a further embodiment of the invention.

A battery system 300, portions of which can be repeated to form a larger battery system (not shown) is provided in FIG. 3. The battery system 300 includes circuit module 302 configured to receive four battery cell units 304a-304d coupled thereto.

The circuit module 302 includes four sets of terminals 306-312 for coupling with the battery cell units 304, each terminal set having a positive terminal 306a, 308a, 310a, 312a and a corresponding negative terminal 306b, 308b, 310b, 312b. Each terminal set 306-312 is configured for coupling to a battery cell unit 304.

In the battery system 300, the components of circuit module 302 are also arranged in such a way that a positive terminal of one set 308a, 312a is directly coupled to the negative terminal of an adjacent set of terminals 306b, 310b by a conductor 318a, 318b.

The positive terminal 306a of a first set of terminals 306 is coupled to a switching assembly comprising switches 322, 326. Battery cell unit 304a is connected to the circuit module 302 when switch 322 is closed and switch 324 is open, and the battery cell unit 304a is bypassed from the circuit module 302 when switch 322 is open and the second switch 324 is closed.

Similarly, the negative terminal 308b of a second set of terminals 308 is coupled to a second switching assembly comprising switches 328, 330. Battery cell unit 304b is connected to the circuit module 302 when switch 330 is closed and switch 328 is open, and battery cell unit 304b is bypassed from the circuit module 302 when switch 330 is open and the second switch 328 is closed. The switching assemblies associated with terminals 310 and 312 operate in a similar manner.

Accordingly, battery system 300 operates in a similar manner to battery system 100 of FIG. 1. Additional switch 326 is closed in the switching sequence that require both switches 324, 328 to be closed. Using a single switch 326 rather than two switches 324, 328 reduces losses created by switch resistance. Switches 321, 333, 338 serve a similar function to switch 326.

In system 300, when all cell units 304a-304d are connected into the current path, the current only flows two switches 321, 333. In this switching state, current passes through less than one switch per active battery cell unit 304, which also results in a switch to active battery cell unit ratio of less than one.

Figure 4:
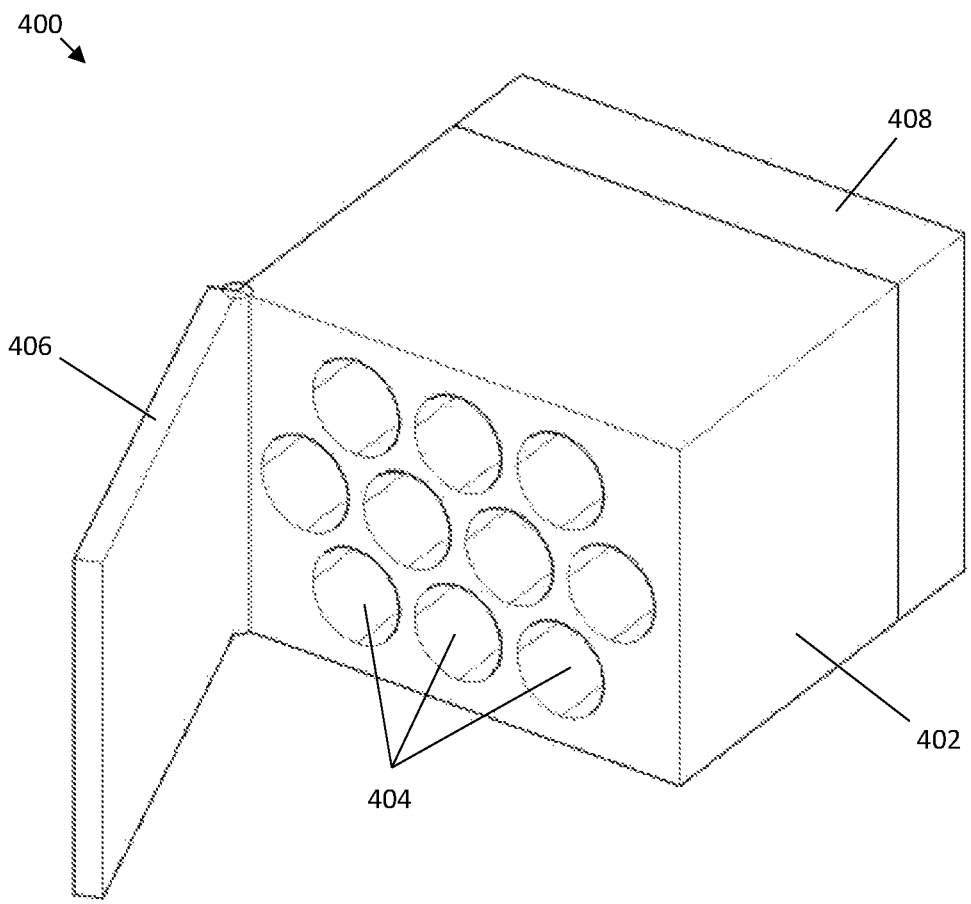
FIG. 4 is a perspective view of a housing of a battery system according to an embodiment of the invention.

A battery pack housing 400 for a battery system is shown in FIG. 4. The housing 400 provides a battery mount 402 mounting and dismounting individual battery cell units 104, 204, 304 for coupling to the circuit module 102, 202, 302. In particular, the battery mount 402 includes a plurality of enclosures 404, each enclosure being configured for receiving a battery cell unit 104, 204, 304 therein. The battery mount 402 allows the battery cell units 104, 204, 304 to be easily removable and replaceable.

The housing 400 includes a door 406 which includes conductors for coupling the battery cell units 104, 204, 304 to the circuit module 102, 202, 302. When the door 406 is open, for example for maintenance, the battery cell units 104, 204, 304 inside the housing 400 are disconnected. In a battery system comprising a number of battery packs each including a housing 400, the battery cell units 104, 204, 304 in any one of the housings 400 can be maintained via door 406 without affecting the operation of adjacent battery packs each having a separate housing 400.

Moreover, integrated circuit boards containing the switching assemblies are located on a single side 408 of the battery pack housing 400 for compactness, reduced losses due to conductor resistance, and manufacturing costs.

Figure 5:
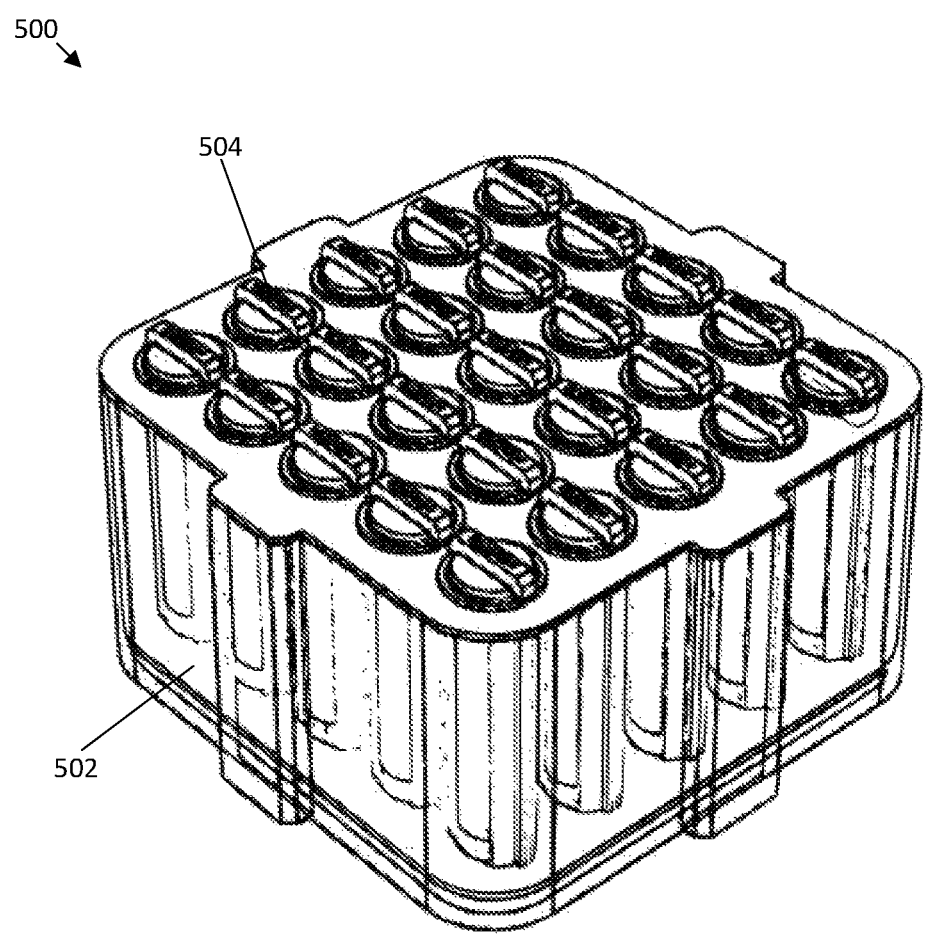
FIG. 5 is a perspective view of a battery pack of a battery system according to an embodiment of the invention.

An alternative battery pack 500 of a battery system is shown in FIG. 5. The battery pack 500 has a battery mount 502 similar to that shown in FIG. 4. However, the battery pack 500 housing provides each battery cell unit with its own individual connection interface 504 so that each individual battery cell unit 104, 204, 304 can be removed, replaced/maintained without disruption to the operation of the other connected battery cell units 104, 204, 304 in the battery pack 500.

A controller including a driving circuit is provided to determine the appropriate switching sequence of the switching assemblies described above. In some embodiments, the controller is a centralised controller to centrally control all switching assemblies. In other embodiments, the controller can include one or more decentralised controllers, each decentralised controller controlling a subset of the switching assemblies.

Figure 6:
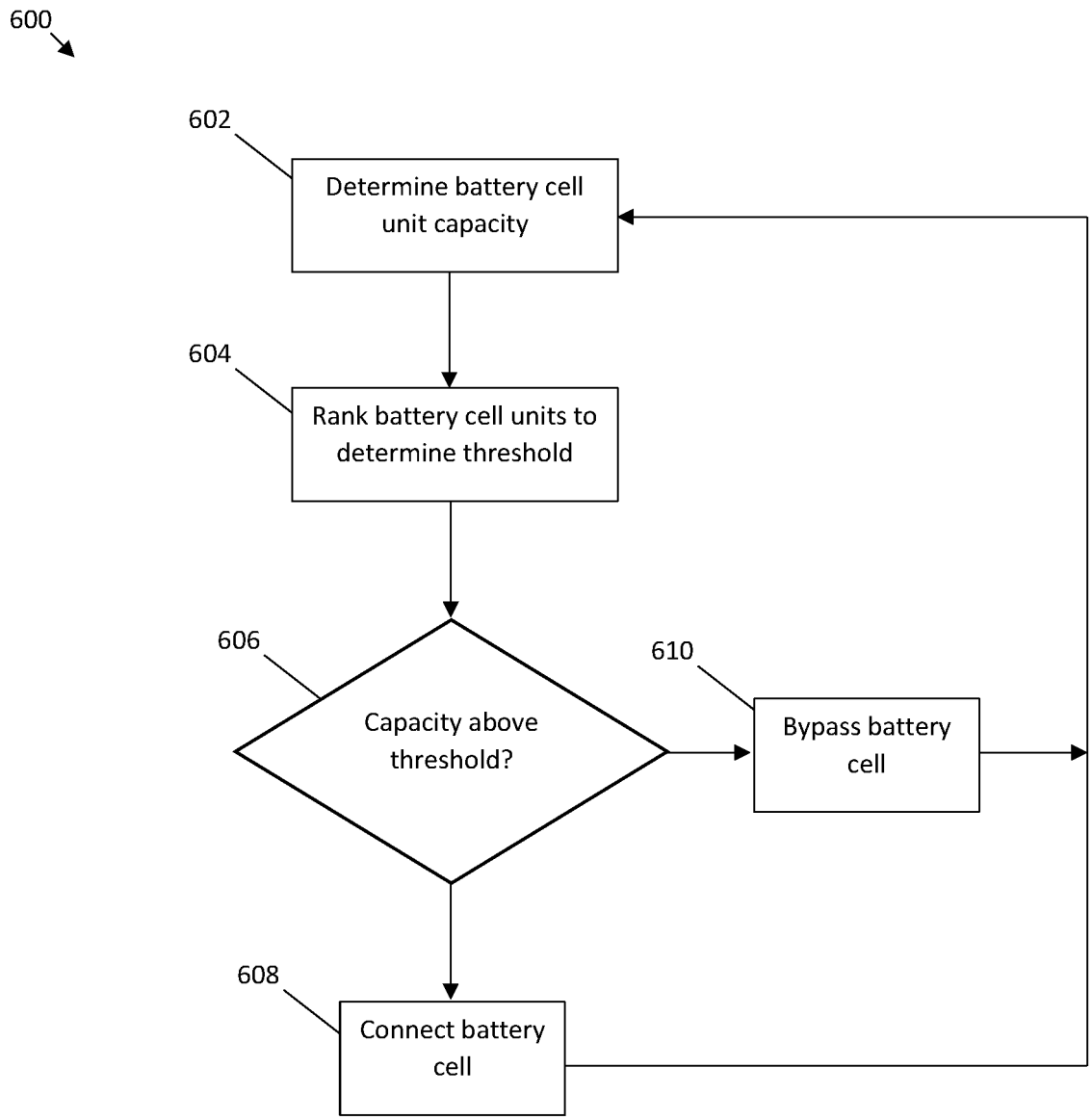
FIG. 6 is a flow diagram illustrating a method of controlling the switch assemblies of a battery system according to an embodiment of the invention.

Now turning to FIG. 6, a method 600 of controlling the switching assemblies is described.

At step 602, the charging and discharging capacity of each battery cell unit 104, 204, 304 is determined based on measurements of the battery voltage and/or battery current, thresholds for voltage and/or current, and/or historical battery measurement data.

At step 604, the controller ranks the capacity of each battery cell unit 104, 204, 304 from highest to lowest or vice versa, and determines a threshold capacity by halving the sum of the capacity for the cell unit with the highest capacity and the cell unit with the lowest capacity.

At query step 606, the controller determines whether the charging and discharging capacity of a given battery cell unit 104, 204, 304 is above or below the threshold determined in step 604. If the capacity of a particular battery cell unit 104, 204, 304 is above the threshold, the method 600 proceeds to step 608, and if not, the method 600 proceeds to step 610.

At step 608, the particular battery cell unit is made active or connected to the circuit module by opening and closing the appropriate switches in the associated switching assembly.

At step 610, the particular battery cell unit is made inactive or bypassed from the circuit module by opening and closing the appropriate switches in the associated switching assembly.

The method 100 is repeated until the battery cell units 104, 204, 304 which are connected to the respective circuit module 100, 200, 300 are fully charged or discharged.

In some embodiments, two or more threshold capacities can be determined and used based on the application requirements. For example, the controller may determine a lower threshold (calculated by multiplying the sum of the capacity for the cell unit with the highest capacity and the cell unit with the lowest capacity by ⅓) and an upper threshold (calculated by multiplying the sum of the capacity for the cell unit with the highest capacity and the cell unit with the lowest capacity by ⅔); and activate the battery cell units having a capacity below the lower threshold a third of the time, activate the battery cell units having a capacity above the lower threshold and below the upper threshold two thirds of the time, and activate the battery cell units having a capacity above the upper threshold on full time. This method can similarly be modified to have three or more thresholds, for example for battery packs having a larger number of battery cell units.

In some embodiments, the controller may monitor each battery cell unit 104, 204, 304 based on maintenance requirements to optimise battery system performance. This optimisation takes into account inputs regarding the battery cell unit behaviour, which can include current and/or past measurements of one or more voltages, currents, and/or temperatures, current and/or past computations of cell unit state of charge and/or state of health. It can also take into account inputs regarding battery maintenance requirements, which can include financial costs associated with battery maintenance, a schedule of when battery maintenance is next operationally feasible or advantageous. In one scenario in which the next maintenance opportunity is some time away, this optimisation may reduce the utilisation and therefore the ageing of lower performing battery cell units to prolong their life until the next maintenance opportunity.

In a different scenario in which the next maintenance is impending, this optimisation may increase the utilisation of weaker battery cell units in order to maximise their utilisation before they get replaced as part of the maintenance.

In another embodiment, the controller carries out automated identification of battery cell unit characteristics. When using battery cell units with variations in performance, there is often value in identifying characteristics in order to provide inputs for battery cell unit usage optimisation. Existing state of the art methods require manual entering of battery data where battery cell units are labelled. This can be a time intense and/or error prone exercise. In one embodiment, automatic identification can be done by monitoring one or more battery cell units' charge and discharge behaviour including but not limited to measurements of voltage, current, and/or temperature. The system may then compare the observed behaviour to a database of information on cell unit types and/or chemistries. This database may provide characteristics that can include but are not limited to the battery chemistry, which may be linked to upper and/or lower voltage limits, current limits, temperature limits and/or ageing impacts of specific utilisation factors.

Interpretation

This specification, including the claims, is intended to be interpreted as follows:

Embodiments or examples described in the specification are intended to be illustrative of the invention, without limiting the scope thereof. The invention is capable of being practised with various modifications and additions as will readily occur to those skilled in the art. Accordingly, it is to be understood that the scope of the invention is not to be limited to the exact construction and operation described or illustrated, but only by the following claims.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

In the specification, including the claims, the term "comprise", and variants of that term such as "comprises" or "comprising", are used to mean "including but not limited to", unless expressly specified otherwise, or unless in the context or usage an exclusive interpretation of the term is required.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

Reference to any background art or prior art in this specification is not an admission such background art or prior art constitutes common general knowledge in the relevant field or is otherwise admissible prior art in relation to the validity of the claims.

The claims defining the invention are as follows:

1. A circuit module for coupling a plurality of battery cell units, the circuit module including
    a first set of terminals having a positive terminal and a negative terminal for coupling to a first battery cell unit,
    a second set of terminals having a positive terminal and a negative terminal for coupling to a second battery cell unit, and
    a third set of terminals having a positive terminal and a negative terminal for coupling to a third battery cell unit, and
    a fourth set of terminals having a positive terminal and a negative terminal for coupling to a fourth battery cell unit,
    the positive terminal of the first set of terminals being coupled to the negative terminal of the second set of terminals either directly or via one or more passive components, the positive terminal of the third set of terminals being coupled to the negative terminal of of the fourth set of terminals either directly or via one or more passive components, the negative terminal of the first set of terminals, the positive terminal of the second set of terminals, at least one of the terminals of the third set of terminals and at least one of the terminals of the fourth set of terminals each being coupled to a switching assembly, and wherein the switching assemblies are operatively configured to selectively connect or disconnect each one of the battery cell units, each switching assembly including one or more switching devices, each switching device operable in a conductive state and a non-conductive state, wherein the switching assemblies are operatively configured to selectively allow operating in a plurality of states in which any two or more battery cell units are connected in series, each state including a charging cycle and a discharging cycle of the battery cell units connected in series, the plurality of states including a first state in which the first battery cell unit and the second battery cell unit are electrically connected in series and the third battery cell unit is disconnected, a second state in which the first battery cell unit and the third battery cell unit are electrically connected in series and the second battery cell unit is disconnected, a third state in which the second battery cell unit and the third battery cell unit are electrically connected in series and the first battery cell unit is disconnected, a fourth state in which the first battery cell unit, the second battery cell unit and the fourth battery cell unit are electrically connected in series and the third battery cell unit is disconnected, and a fifth state in which the first battery cell unit, the second battery cell unit, the third battery cell unit and the fourth battery cell unit are electrically connected in series, and wherein the first battery cell unit, the second battery cell unit, the third battery cell unit and the fourth battery cell unit are adjacently positioned to one another such that the fifth stale is achieved via a connection path having a minimum number of conducting switching devices within the circuit module, and wherein when the second battery cell unit and the third battery cell unit are connected in series, a series connection path between the second battery cell unit and the third battery cell unit includes a maximum of two switching devices operating in the conductive state.

2. The circuit module of claim 1, wherein the circuit module allows a battery cell unit to be connected to an adjacent battery cell unit with at most one conducting switching device in a current path therebetween.

3. The circuit module of claim 1, wherein the circuit module allows a battery cell unit to be connected to a non-adjacent battery cell unit with at most one conducting switching device in a current path therebetween.

4. The circuit module of claim 1, wherein in any switching state of the switching assemblies, the ratio of conductive switching devices to battery cell units is less than one during operation of the circuit module.

5. The circuit module of claim 1, wherein each switching assembly includes a first switching device for connecting an associated battery cell unit, and a second switching device for disconnecting the associated battery cell unit.

6. The circuit module of claim 1, wherein the switching assemblies include one or more electromechanical relays.

7. The circuit module of claim 1, wherein the switching assemblies includes one or more transistors.

8. The circuit module of claim 1, wherein the switching assemblies can be operatively configured to selectively connect any one or more battery cell units to the circuit module without altering the polarity of the connected battery cell units.

9. A battery system including
one or more circuit modules of claim 1, and
a plurality of battery cell units coupled to the circuit module.

10. The battery system of claim 9, wherein the battery cell units are used battery cell units.

11. The battery system of claim 9, wherein the battery cell units are used vehicle batteries.

12. The battery system of claim 9, further including a battery mount configured to allow one or more battery cell units to be mounted for coupling to the circuit module, wherein all switching assemblies of the circuit module are located to one side of the battery mount.

13. The battery system of claim 12, wherein the battery mount is configured to allow the one or more battery cell units to be retrofitted to the battery system at any time during its operating life.

14. The battery system of claim 9, further including a controller for controlling the switching assemblies of the circuit module.

15. The battery system of claim 14, wherein the controller controls the switching assemblies based on the charge and discharge behaviour of the battery cell units.

16. The battery system of claim 15, wherein the controller determines the charge and discharge behaviour of each battery cell unit based on the voltage, current and/or temperature of the battery cell unit during charging and/or discharging.

17. The battery system of claim 16, wherein the controller
compares a measured voltage, current and/or temperature of the battery cell unit with predetermined voltage, current and/or temperature ranges,
determines the battery cell units to connect and/or disconnect, and
controls the switching assemblies to connect or disconnect each battery cell unit.

18. The battery system of claim 9, wherein the switching assemblies can be operatively configured to selectively connect or disconnect any one or more of the battery cell units so as to vary a total voltage output from the plurality of battery cell units.

* * * * *